US012545029B2

(12) United States Patent
Takahashi

(10) Patent No.: US 12,545,029 B2
(45) Date of Patent: Feb. 10, 2026

(54) HEAD MAINTENANCE DEVICE, IMAGE FORMING APPARATUS, AND HEAD MAINTENANCE METHOD

(71) Applicant: Kenta Takahashi, Kanagawa (JP)

(72) Inventor: Kenta Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 143 days.

(21) Appl. No.: 18/208,325

(22) Filed: Jun. 12, 2023

(65) Prior Publication Data

US 2023/0398782 A1 Dec. 14, 2023

(51) Int. Cl.
*B41J 2/165* (2006.01)
*B41J 2/045* (2006.01)

(52) U.S. Cl.
CPC ....... *B41J 2/16552* (2013.01); *B41J 2/04541* (2013.01); *B41J 2/04581* (2013.01); *B41J 2/04588* (2013.01); *B41J 2/16511* (2013.01); *B41J 2002/16567* (2013.01)

(58) Field of Classification Search
CPC . B41J 2/16552; B41J 2/04541; B41J 2/04581
See application file for complete search history.

(56) References Cited

U.S. PATENT DOCUMENTS 9,724,922 B2 * 8/2017 Gengrinovich ...... B41J 2/16517
2015/0336388 A1 11/2015 Ohnishi
2016/0325550 A1 11/2016 Masaoka et al.
2019/0184709 A1 6/2019 Hasebe et al.
2021/0394516 A1 12/2021 Takahashi
2022/0305796 A1 9/2022 Takahashi et al.
2022/0305797 A1 9/2022 Takahashi et al.

FOREIGN PATENT DOCUMENTS

JP 2012-071573 4/2012
JP 2014-094518 A 5/2014
JP 2014-104594 A 6/2014
JP 2015-085660 A 5/2015
JP 2015-212047 11/2015
JP 2016-013676 A 1/2016
JP 2020-026129 2/2020

OTHER PUBLICATIONS

Extended European Search Report issued Oct. 18, 2023 in European Patent Application No. 23177190.8, 15 pages.
Office Action issued Jul. 8, 2025 in corresponding European Patent Application No. 23177190.8.
MS Copilot Consultation Regarding Superposition of Frequencies, Jul. 8, 2025 (date of EP Office Action).

* cited by examiner

*Primary Examiner* — Lam S Nguyen
(74) *Attorney, Agent, or Firm* — XSENSUS LLP

(57) ABSTRACT

Ahead maintenance device includes a cap and circuitry. The cap is detachably attachable to a nozzle surface of a head to cover the nozzle surface having a nozzle. The circuitry causes the cap to contact the nozzle surface of the head to form a space between the nozzle surface and the cap filled with a cleaning liquid, and applies a drive waveform to a piezoelectric element of the head to apply vibration to the cleaning liquid in the space. The drive waveform causes the head to draw the cleaning liquid into an interior of the head through the nozzle.

9 Claims, 10 Drawing Sheets

COMPARATIVE EXAMPLE

COMPARATIVE EXAMPLE

HEAD MAINTENANCE DEVICE, IMAGE FORMING APPARATUS, AND HEAD MAINTENANCE METHOD

CROSS-REFERENCE TO RELATED APPLICATION

This patent application is based on and claims priority pursuant to 35 U.S.C. § 119(a) to Japanese Patent Application No. 2022-095147, filed on Jun. 13, 2022, in the Japan Patent Office, the entire disclosure of which is hereby incorporated by reference herein.

BACKGROUND

Technical Field

Embodiments of the present disclosure relate to a head maintenance device, an image forming apparatus, and a head maintenance method.

Related Art

In the related art, an image forming apparatus such as an inkjet printer discharges a liquid onto a recording medium to form an image. Such an inkjet printer includes a liquid discharge head that discharges ink as liquid droplets.

SUMMARY

Embodiments of the present disclosure describe an improved head maintenance device that includes a cap and circuitry. The cap is detachably attachable to a nozzle surface of ahead to cover the nozzle surface having a nozzle. The circuitry cause the cap to contact the nozzle surface of the head to form a space between the nozzle surface and the cap filled with a cleaning liquid, and applies a drive waveform to a piezoelectric element of the head to apply vibration to the cleaning liquid in the space. The drive waveform causes the head to draw the cleaning liquid into an interior of the head through the nozzle.

According to another embodiment of the present disclosure, there is provided a head maintenance device including a cap and circuitry. The cap is detachably attachable to a nozzle surface of a head to cover the nozzle surface having a nozzle row having multiple nozzles. The circuitry cause the cap to contact the nozzle surface to form a space between the nozzle surface and the cap filled with a cleaning liquid, and applies multiple drive waveforms to multiple piezoelectric elements of the head to apply vibration to the cleaning liquid in the space. The multiple drive waveforms cause the head to circulate the cleaning liquid between the space and an interior of the head through the multiple nozzles in a circulation direction.

According to yet another embodiment of the present disclosure, there is provided a head maintenance method including causing the cap filled with a cleaning liquid to contact a nozzle surface of a head to cover the nozzle surface having a nozzle to form a space between the nozzle surface and the cap, and applying a drive waveform to a piezoelectric element of the head to apply vibration to the cleaning liquid in the space. The drive waveform causes the head to draw the cleaning liquid into an interior of the head through the nozzle.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
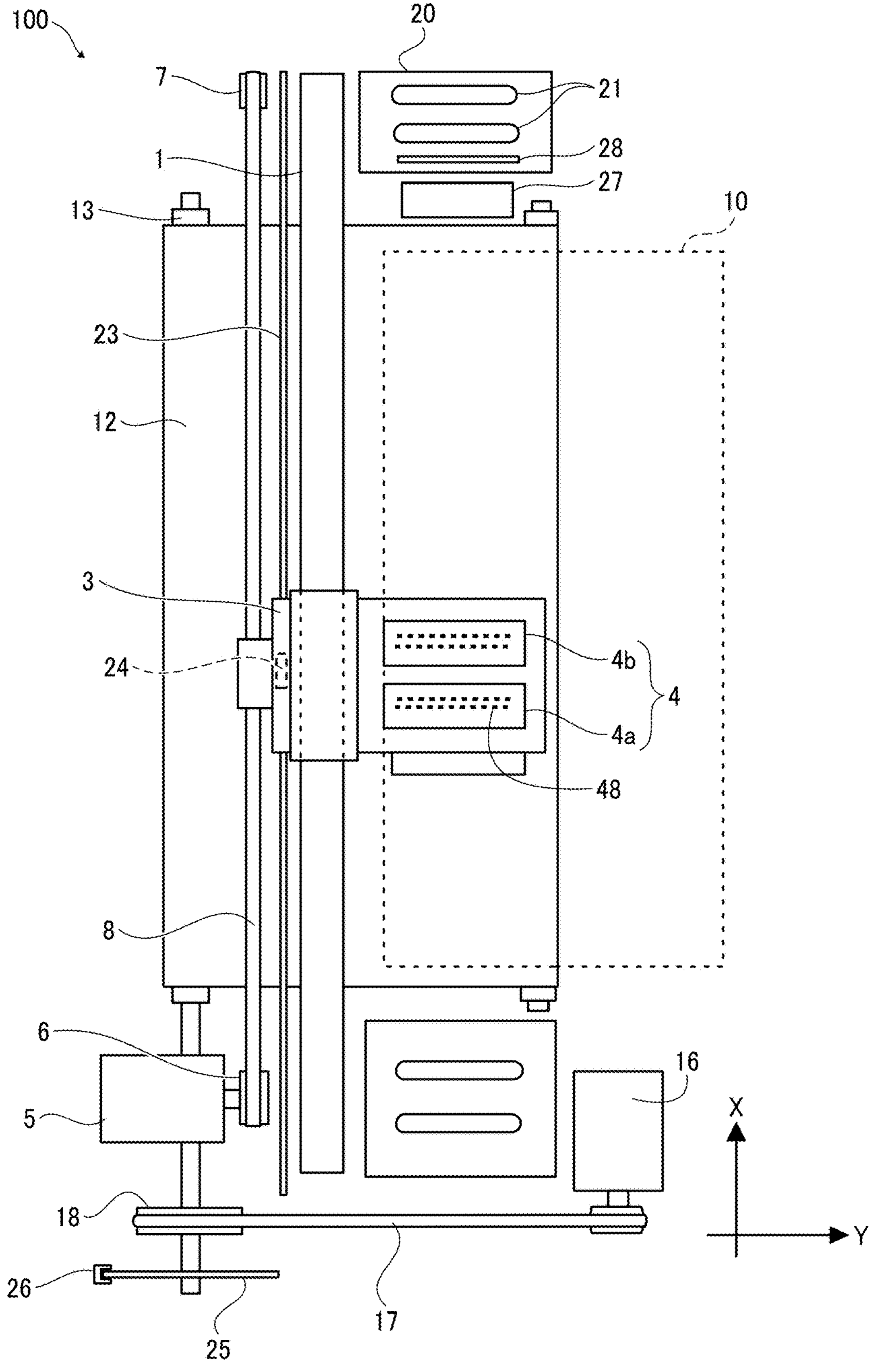
FIG. 1 is a diagram illustrating a configuration of an image forming apparatus including a liquid discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments according to the present disclosure are sequentially described with reference to the drawings. In the description of embodiments below, components having the same function and configuration are appended with the same reference codes, and redundant descriptions thereof may be omitted. Components in the drawings may be partially omitted or simplified to facilitate understanding of the configurations.

FIG. 1 is a diagram illustrating a configuration of an image forming apparatus 100 including a liquid discharge head applicable as an embodiment of the present disclosure. In the present embodiment, the image forming apparatus 100 is a serial-type inkjet recording apparatus, but is not limited to such a configuration.

The image forming apparatus 100 functions as a so-called inkjet printer. The image forming apparatus 100 includes a carriage 3 held by a main guide 1. The carriage 3 is movable in an X direction, which is a main scanning direction, with respect to a sheet P as a recording medium. The sheet P is placed on a conveyance belt 12 and moved with the conveyance belt 12 in a Y direction, which is sub-scanning direction.

The term "sheet" is not limited to sheet of paper and represents a recording medium, such as an overhead projector (OHP) transparency, fabric, glass, or a substrate, to which ink droplets or other liquid droplets discharged from the liquid discharge head can adhere. The terms "image formation," "recording," "printing," and "image printing" are used synonymously with one another. The term "image formation" performed by the image forming apparatus 100 includes aspects of providing not only meaningful images, such as characters and figures, but also meaningless images, such as patterns, to the recording medium and coating the recording medium with liquid droplets.

In addition to normal ink, any liquid such as a recording liquid or a fixing treatment liquid with which an image can be formed is collectively referred to as "ink." Examples of the liquid other than the so-called ink include a DNA sample, a resist, a pattern material, and a resin.

The term "image" is not limited to an image formed on a flat surface, and may be a three-dimensional object formed by liquid droplets or an image formed on a three-dimensional surface of the three-dimensional object.

The image forming apparatus 100 further includes a main scanning motor 5 serving as a driving source for moving the carriage 3 in the X direction, and a timing belt 8 wound around a drive pulley 6 and a driven pulley 7. The carriage 3 moves in the X direction as the main scanning motor 5 rotates.

The image forming apparatus 100 includes a recording head 4 as a liquid discharge head (or simply referred to as a head). The recording head 4 is attached to the carriage 3 and moved together with the carriage 3. The recording head 4 is an ink head that discharges ink droplets of colors of yellow (Y), cyan (C), magenta (M), and black (K), for example. Multiple recording heads 4 may be attached to the carriage 3 in accordance with the colors. FIG. 1 illustrates a configuration in which multiple recording heads 4*a* and 4*b* are mounted on the carriage 3.

On one side of the carriage 3 in the main scanning direction (on a side in +X direction relative to the carriage 3 in FIG. 1), the image forming apparatus 100 includes a maintenance device 20 as a head maintenance device that maintains and recovers the recording head 4 lateral to the conveyance belt 12. A dummy discharge receiver 27 is disposed adjacent to the maintenance device 20 in −X direction to receive ink Q (see FIG. 4) discharged from the recording head 4 during dummy discharge.

The image forming apparatus 100 further includes an encoder scale 23 and an encoder sensor 24. A predetermined pattern is formed on the encoder scale 23 in the main scanning direction of the carriage 3. The encoder sensor 24 is a transmissive photosensor attached to the carriage 3 to read the pattern of the encoder scale 23. The encoder scale 23 and the encoder sensor 24 construct a main scanning encoder as a linear encoder. The image forming apparatus 100 detects a position of the carriage 3 in the main scanning direction with the main scanning encoder.

The conveyance belt 12 is a conveyor on which the sheet P is placed. The sheet P is movable together with the conveyance belt 12 in the sub-scanning direction orthogonal to the main scanning direction, that is, in the Y direction in FIG. 1. The sheet P on the conveyance belt 12 is moved in the Y direction by a belt guide 13, a pulley 18 attached to a shaft of the belt guide 13, and a belt 17 wound around the pulley 18 and a sub-scanning motor 16.

At this time, an encoder sensor 26 reads an encoder scale 25 on which a predetermined pattern is formed, thereby constructing a sub-scanning encoder. Thus, the image forming apparatus 100 detects a position of the sheet P in the sub-scanning direction with the sub-scanning encoder.

Figure 2:
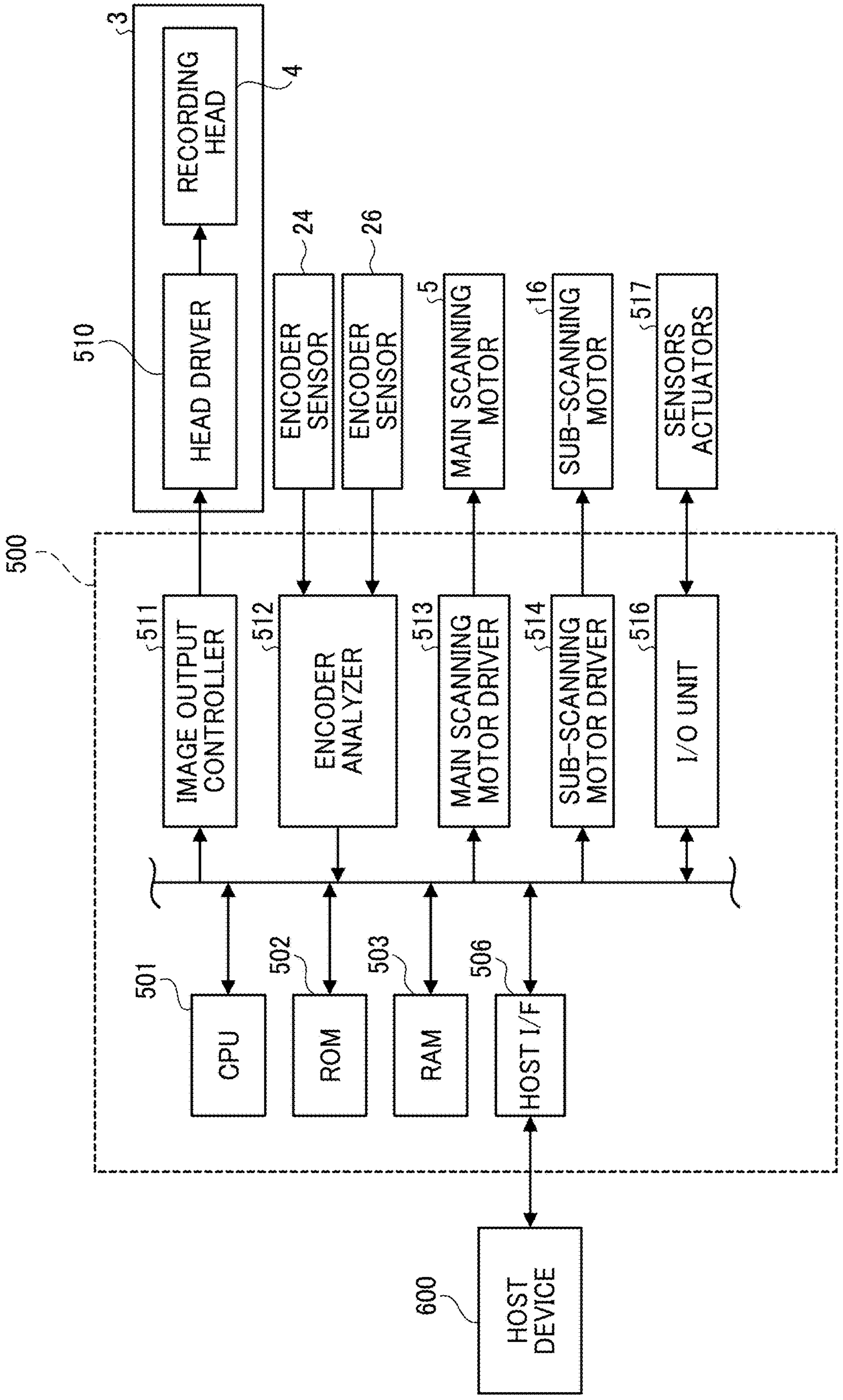
FIG. 2 is a block diagram illustrating a functional configuration of a controller according to an embodiment of the present disclosure.

The image forming apparatus 100 includes a controller 500 for controlling the above-described components. As illustrated in a block diagram of FIG. 2, the controller 500 includes a central processing unit (CPU) 501, a read only memory (ROM) 502, and a random access memory (RAM) 503. The CPU 501 controls the controller 500 and the entire system of the image forming apparatus 100. The ROM 502 stores programs to be executed by the CPU 501 and other fixed data. The RAM 503 temporarily stores image data and the like.

The controller 500 further includes a host interface (I/F) 506, an image output controller 511, and an encoder analyzer 512. The host I/F 506 transmits and receives data to and from a host device 600 such as a personal computer (PC). The image output controller 511 controls a head driver 510 to drive the recording head 4. The encoder analyzer 512 controls the main scanning encoder and the sub-scanning encoder based on detection signals from the encoder sensors 24 and 26.

The controller 500 further includes a main scanning motor driver 513, a sub-scanning motor driver 514, and an input/output (I/O) unit 516. The main scanning motor driver 513 drives the main scanning motor 5. The sub-scanning motor driver 514 drives the sub-scanning motor 16. The controller 500 communicates with various sensors and actuators 517 via the I/O unit 516.

The image output controller 511 includes a data generation unit, a drive waveform generation unit, and a data transfer unit. The data generation unit generates print data. The drive waveform generation unit outputs a drive waveform for driving the recording head 4. The data transfer unit transfers the print data and a head control signal for selecting a desired drive signal from the generated drive waveforms.

The image output controller 511 outputs the respective output data (the drive waveform, the head control signal, and the print data) generated by the above-described units to the head driver 510 which is a head drive circuit for driving the recording head 4, thereby controlling liquid droplets discharged from the recording head 4 to print an image corresponding to the print data.

In the present embodiment, the two recording heads 4 (4*a* and 4*b*) are mounted on the carriage 3. As illustrated in FIG.

3, the recording head 4 has two nozzle rows Na and Nb in which multiple nozzles 48 are arranged at a predetermined interval.

Figure 3:
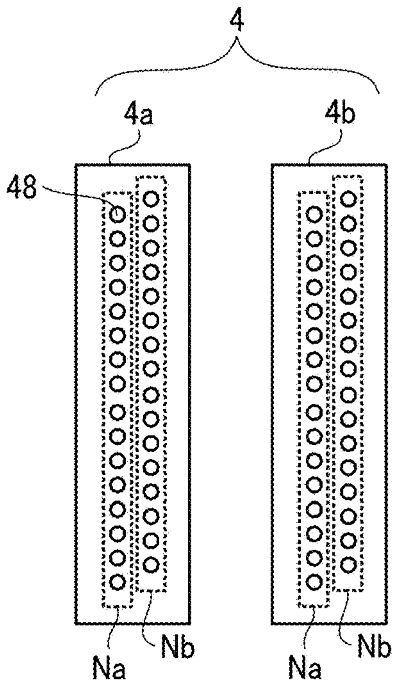
FIG. 3 is a diagram illustrating a configuration of the liquid discharge head.

In the present embodiment, in particular, the nozzle row Na of the recording head 4*a* illustrated on the left side in FIG. 3 discharges liquid droplets of black (K), and the nozzle row Nb of the recording head 4*a* discharges liquid droplets of cyan (C). The nozzle row Na of the recording head 4*b* illustrated on the right side in FIG. 3 discharges liquid droplets of magenta (M), and the nozzle row Nb of the recording head 4*b* discharges liquid droplets of yellow (Y). The colors of the liquid droplets discharged from the recording heads 4*a* and 4*b* are not limited to the above-described combination. For example, one recording head 4 may have four nozzle rows, or liquid droplets of the same color may be discharged from two or more nozzle rows.

Figure 4:
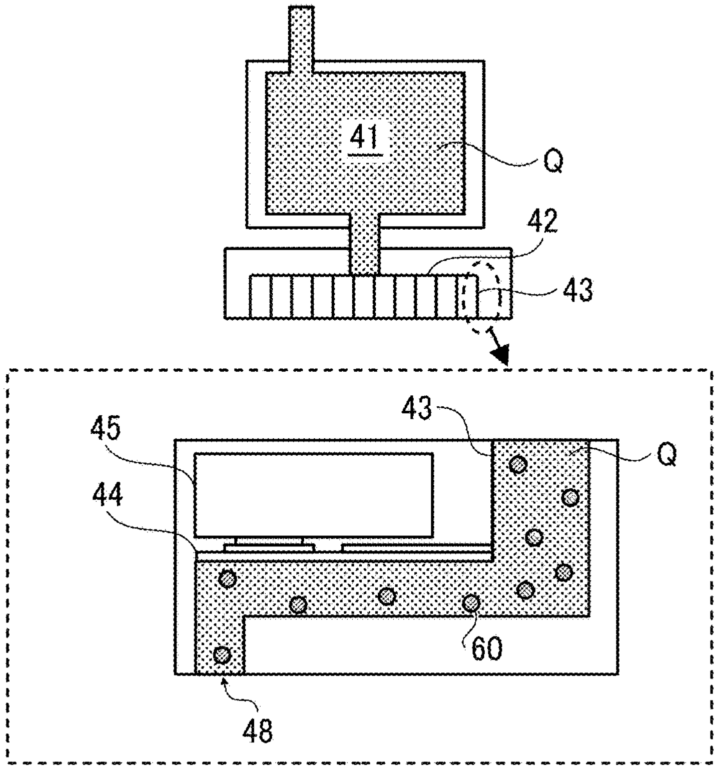
FIG. 4 is a diagram illustrating an internal configuration of the liquid discharge head illustrated in FIG. 3.

In the present embodiment, the recording head 4 treats each of the nozzle rows Na and Nb as a different nozzle group driven by a different drive waveform. FIG. 4 illustrates an internal structure of the recording head 4. As illustrated in FIG. 4, the recording head 4 includes a head tank 41 and a common liquid chamber 42. The head tank 41 stores ink Q therein. The common liquid chamber 42 is disposed in the middle of a supply channel 43 extending from the head tank 41 toward each of the nozzles 48. In other words, multiple supply channels 43 extend from the common liquid chamber 42 toward the corresponding nozzles 48 which are openings.

The recording head 4 further includes a piezoelectric element 45 which is a vibration applying mechanism. The piezoelectric element 45 presses a wall of the supply channel 43 via a diaphragm 44 to change a volume of the supply channel 43, thereby discharging the ink Q inside the supply channel 43.

The piezoelectric element 45 is a piezoelectric actuator that expands and contracts when a voltage is applied thereto. The piezoelectric element 45 expands or contracts based on an electrical signal from the head driver 510 and moves the diaphragm 44 to change the position of the wall of the supply channel 43, thereby changing a volume of the supply channel 43.

FIG. 4 is a cross-sectional view of the recording head 4 including the piezoelectric element 45, focusing on one of the multiple nozzles 48. A lower part of FIG. 4 is an enlarged view of the supply channel 43 enclosed by a broken line in an upper part of FIG. 4. As illustrated in FIG. 4, the nozzle 48 as an opening is disposed at each terminal end of the supply channel 43. The ink Q flowing through the supply channel 43 is discharged from the nozzle 48 in accordance with the movement of the piezoelectric element 45.

In the present embodiment, one piezoelectric element 45 corresponds to one nozzle 48, but the configuration of the recording head 4 is not limited thereto. For example, multiple nozzles 48 may correspond to one supply channel 43, and the ink Q may be discharged from the multiple nozzles 48 by the movement of one piezoelectric element 45.

When white ink or silver ink is used, which includes a pigment component having a large specific gravity, a precipitation of the pigment component called caking is likely to occur. As illustrated in a left part of FIG. 5, pigments 60 are sufficiently stirred and uniformly dispersed in the ink Q, that is, an ideal state for usage. However, the pigments 60 may precipitate out of the ink Q with elapsed time according to the specific gravity of the component of the pigments 60, and the precipitated pigments 60 may accumulate on the bottom surface and solidify as illustrated in a right part of FIG. 5. Such a state in which the pigments 60 precipitate out of the ink Q and spontaneously solidify is referred to as the caking.

Figure 5:
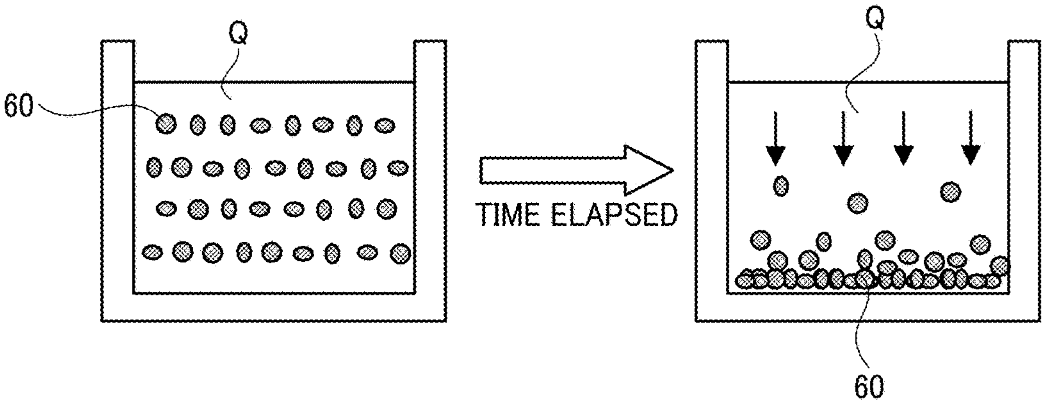
FIG. 5 is a diagram illustrating precipitation of ink used in the liquid discharge head.

When such a precipitation occurs mildly, the ink Q can be returned to the state immediately after stirring as illustrated in the left part of FIG. 5 by stirring the ink Q again. For this reason, in the inkjet image forming apparatus, a maintenance method is widely performed in which a user periodically vibrates a cartridge containing the ink Q to stir the ink Q in the cartridge to prevent the ink Q from precipitating, or the ink Q in the recording head 4 is stirred, discharged, or circulated to prevent the ink Q from precipitating.

However, if the pigments 60 solidify once, it is difficult to re-disperse the pigments 60, and it is difficult to create a uniformly dispersed state of the pigments 60 even if the pigments 60 is stirred. Therefore, a method for preventing such caking or recovering from the caking has been demanded.

Figure 6A:
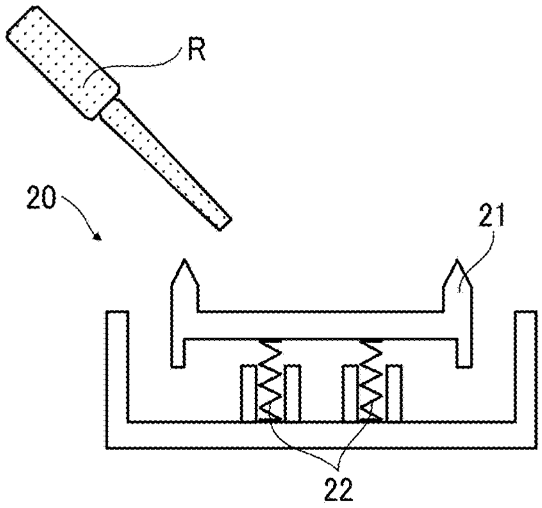
FIGS. 6A to 6D are diagrams illustrating an example of a maintenance operation of the liquid discharge head by a maintenance device according to an embodiment of the present disclosure.
Figure 6B:
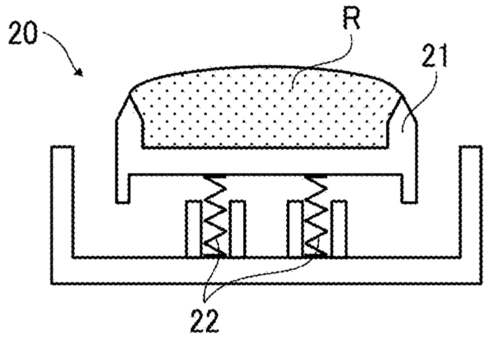
Figure 6C:
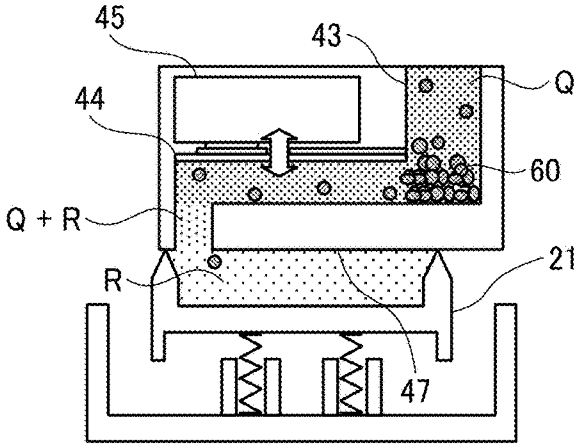

When such caking occurs in the vicinity of the nozzle 48 in the recording head 4 as illustrated in FIG. 6C, for example, in the supply channel 43, the supply channel 43 is clogged with the caking formed of the pigments 60 (i.e., nozzle clogging). As a result, the ink Q may not be discharged from the nozzle 48, and it is difficult to recover the recording head 4 from the nozzle clogging by a normal maintenance operation.

When the pigments 60 accumulate in the narrow supply channel 43 as described above, the recording head 4 may be replaced to return the recording head 4 to a normal discharge state. In addition, the caking is likely to occur when a machine error occurs during a long-term vacation in which a user does not immediately deal with the machine error. If the nozzle 48 is clogged, normal printing is difficult, and downtime of the normal printing occurs, causing a disadvantage to the user.

Therefore, in the present embodiment, the maintenance device 20 for the recording head 4 is provided in order to eliminate, in a short period of time, clogging of the nozzle 48 in the recording head 4, which is hardly recovered to the normal discharge state by the normal maintenance operation.

The controller 500 moves the recording head 4 to the maintenance device 20 and controls the recording head 4 to function as a maintenance unit (i.e., circuitry of the maintenance device 20) that eliminates the caking of the pigments 60 and the clogging of the nozzle 48. The operation of the maintenance device 20 is described with reference to FIGS. 6A to 6D.

First, as illustrated in FIG. 6A, the maintenance device 20 includes a cap 21 that holds a cleaning liquid R, a spring 22 that supports the cap 21, and a wiper 28 (see FIG. 1) that wipes a nozzle surface 47 of the recording head 4. The cap 21 is detachably attached to the nozzle surface 47 so as to cover the nozzle surface 47.

As illustrated in FIG. 6B, the cap 21 has an open-topped box shape to be filled with the cleaning liquid R. The cap 21 holding the cleaning liquid R is attached to the nozzle surface 47 of the recording head 4 so that the nozzle 48 is immersed in the cleaning liquid R. The spring 22 presses the cap 21 upward and can dampen vibration of the piezoelectric element 45, which is described later.

In the present embodiment, the cleaning liquid R is a liquid different from the ink Q. The cleaning liquid R is preferably a liquid having a lower concentration than the ink Q so that the caking is more likely to diffuse due to a diffusion phenomenon caused by a concentration difference.

Figure 7A:
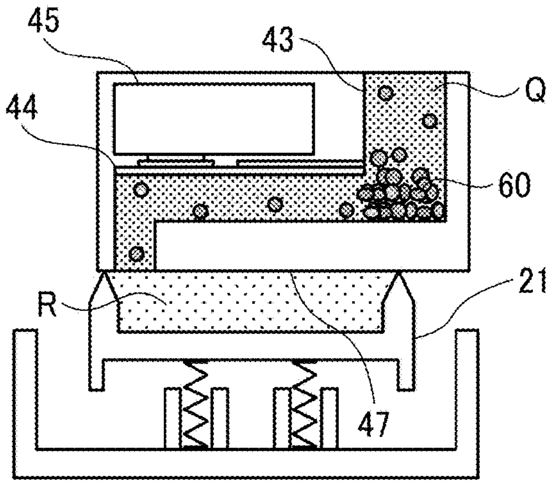
FIGS. 7A and 7B are diagrams illustrating an example of a maintenance operation in which the liquid discharge head is immersed in a cleaning liquid according to a comparative example.
Figure 7B:
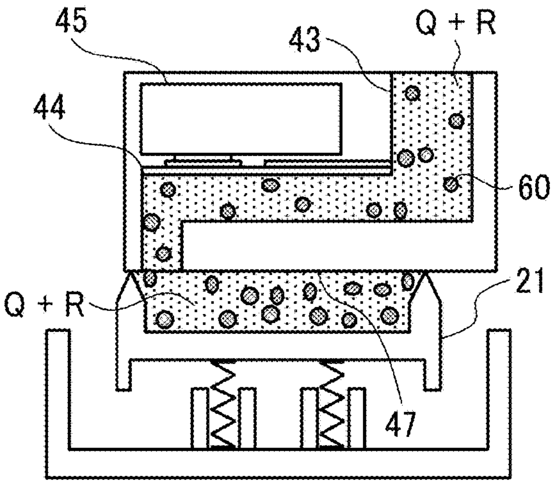

In a comparative example, as illustrated in FIGS. 7A and 7B, the nozzle surface 47 is immersed in the cleaning liquid R in the cap 21 for a long time in the maintenance operation to gradually remove the caking in the recording head 4 by the diffusion phenomenon of the caking due to the cleaning liquid R, thereby eliminating the nozzle clogging.

However, in this maintenance operation in which the cap 21 is attached to the nozzle surface 47 and the nozzle surface 47 is simply immersed in the cleaning liquid R, it may take several hours to several weeks to completely diffuse the caking into the cleaning liquid R. Accordingly, the nozzle surface 47 is immersed in the cleaning liquid R for a long time to eliminate the caking as illustrated in FIG. 7B.

This is because, in the recording head 4 filled with the ink Q, it takes time to replace the ink Q around the caking with the cleaning liquid R and to eliminate the caking by the diffusion phenomenon of the caking due to the cleaning liquid R. In order to increase the speed of the replacement of the ink Q with the cleaning liquid R, all of the ink Q in the recording head 4 may be dummy discharged, but it also takes a long time for such replacement.

Figure 6D:
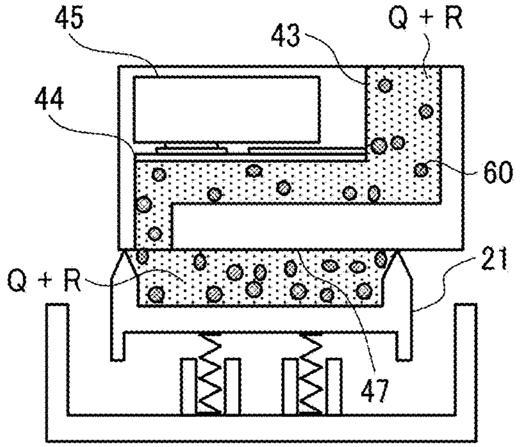

In the present embodiment, as illustrated in FIG. 6C, the head driver 510 drives the piezoelectric element 45 while the nozzle surface 47 is immersed in the cleaning liquid R to apply vibration to the caking of the pigments 60, thereby facilitating the caking diffusing. Further, the head driver 510 drives the piezoelectric element 45 so as to draw the cleaning liquid R into the nozzle 48 to accelerate the replacement of the ink Q with the cleaning liquid R in the supply channel 43. As a result, in the present embodiment, the recording head 4 can be recovered to the normal discharge state as illustrated in FIG. 6D faster than the comparative example (e.g., the maintenance operation using the dummy discharge or the maintenance operation in which the nozzle surface 47 is simply immersed in the cleaning liquid R).

Figure 8:
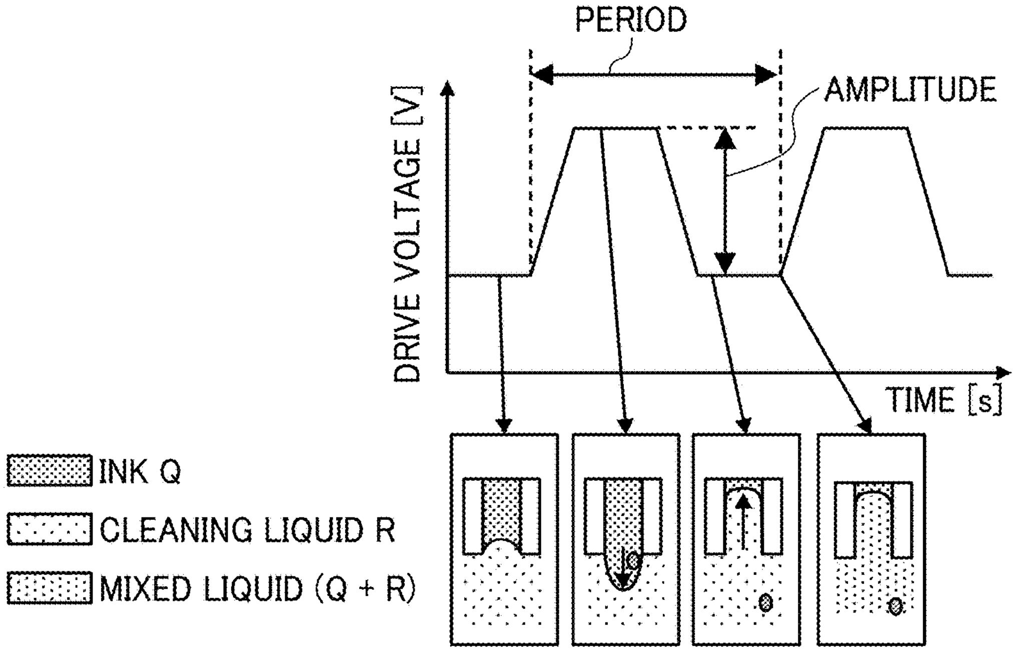
FIG. 8 is a diagram illustrating an example of a drive method during the maintenance operation of the liquid discharge head according to an embodiment of the present disclosure.

FIG. 8 illustrates a specific drive waveform to be applied to the piezoelectric element 45 of the recording head 4 and typical examples of a change in the liquid level in the cross section of the nozzle 48 caused by the drive waveform. Note that the vibration by the same drive waveform causes the same change in the liquid level, for example, when the ink Q is discharged.

In an initial state in which a voltage of the drive waveform is low and the piezoelectric element 45 is neutral, the ink Q recedes from the nozzle 48 (the nozzle surface 47) in a meniscus shape in accordance with a pressure inside the supply channel 43. The ink Q and the cleaning liquid R are mixed with each other due to a concentration difference therebetween in the present embodiment. However, an interface between the ink Q and the cleaning liquid R is illustrated in FIG. 8 for the sake of illustration.

When the voltage applied to the piezoelectric element 45 is increased, the piezoelectric element 45 expands, and the pressure in the supply channel 43 increases, thereby discharging the ink Q from the nozzle 48. In other words, the interface between the ink Q and the cleaning liquid R moves downward in FIG. 8.

When the voltage applied to the piezoelectric element 45 is returned to low (the initial state), the piezoelectric element 45 contracts, and the volume of the supply channel 43 increases, so that the interface between the ink Q and the cleaning liquid R moves upward in FIG. 8. At this time, even if the applied voltage is the same as that in the initial state, the pressure in the supply channel 43 is reduced by an amount of the ink Q discharged from the nozzle 48, and the cleaning liquid R is likely to enter deeper into the supply channel 43 than in the initial state, so that the interface is maintained higher than in the initial state in FIG. 8. At this time, actually, the vicinity of the nozzle 48 is filled with not only the cleaning liquid R but also a mixed liquid of the cleaning liquid R and the ink Q discharged from the nozzle 48.

The head driver 510 repeatedly applies the voltage to the piezoelectric element 45 while the recording head 4 is attached to the maintenance device 20 to vibrate the cleaning liquid R in the cap 21, thereby accelerating the diffusion phenomenon. Further, at this time, the interface between the ink Q and the cleaning liquid R moves up and down, thereby stirring the ink Q and the cleaning liquid R. As a result, the cleaning liquid R further enters the inside of the nozzle 48 to further dilute the ink Q in the supply channel 43 and replace the ink Q with the cleaning liquid R.

As described above, the controller 500 causes the head driver 510 to apply the drive waveform to the piezoelectric element 45 to apply a predetermined vibration to the piezoelectric element 45. Thus, the piezoelectric element 45 is operated so as to draw the cleaning liquid R in the cap 21 into the recording head 4 through the nozzle 48. As described above, in the present embodiment, the head driver 510 drives the piezoelectric element 45 to function as a vibration applying unit (i.e., the circuitry of the maintenance device 20) that applies vibration to the cleaning liquid R in a space between the cap 21 and the nozzle surface 47.

In FIG. 8, the drive waveform with which the head driver 510 drives the piezoelectric element 45 has a constant amplitude and a constant period to regularly move the interface up and down for simplicity. Alternately, vibration caused by another drive waveform may randomly move the interface up and down to enhance a stirring effect to mix the cleaning liquid R and the ink Q.

Figure 9:
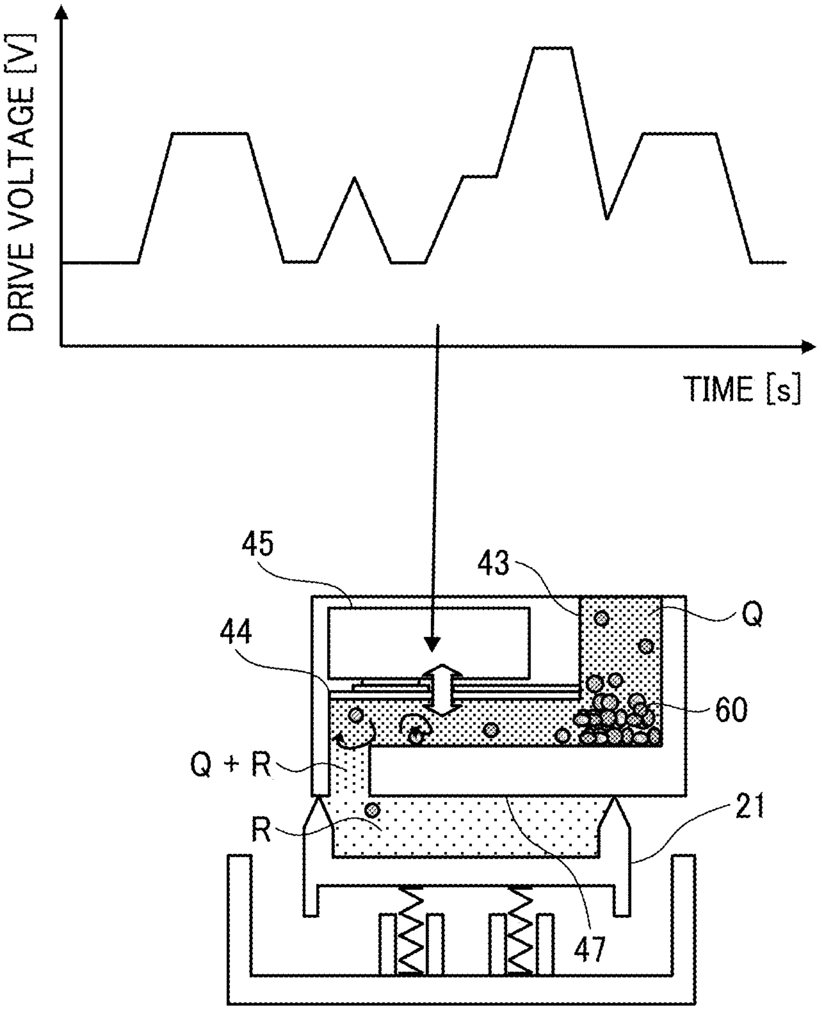
FIG. 9 is a diagram illustrating another example of the drive method illustrated in FIG. 8.

Accordingly, as illustrated in FIG. 9, one drive waveform applied to the piezoelectric element 45 by the head driver 510 may include multiple drive waveforms having different periods and amplitudes in combination to randomly vibrate the piezoelectric element 45. The term "random vibration" as used herein includes not only vibration having no periodicity but also vibration having varying amplitude, and vibration having a sufficiently long period with respect to a time interval at which a turbulent flow is generated. Such a long period may be regarded as having no periodicity in the operation time of the piezoelectric element 45. A drive waveform having a specific frequency or a specific period may be applied to drive the piezoelectric element 45 for a certain time or a certain number of periods, and then another drive waveform having a different specific frequency or a different specific period may be applied to drive the piezoelectric element 45 for a certain time or a certain number of periods.

Such a drive waveform randomly changes the pressure inside the supply channel 43, thereby generating the turbulent flow in the recording head 4. As a result, a stirring efficiency of the liquid (the mixed liquid of the ink Q and the cleaning liquid R) in the recording head 4 can be enhanced, thereby further enhancing a maintenance performance.

Figure 10:
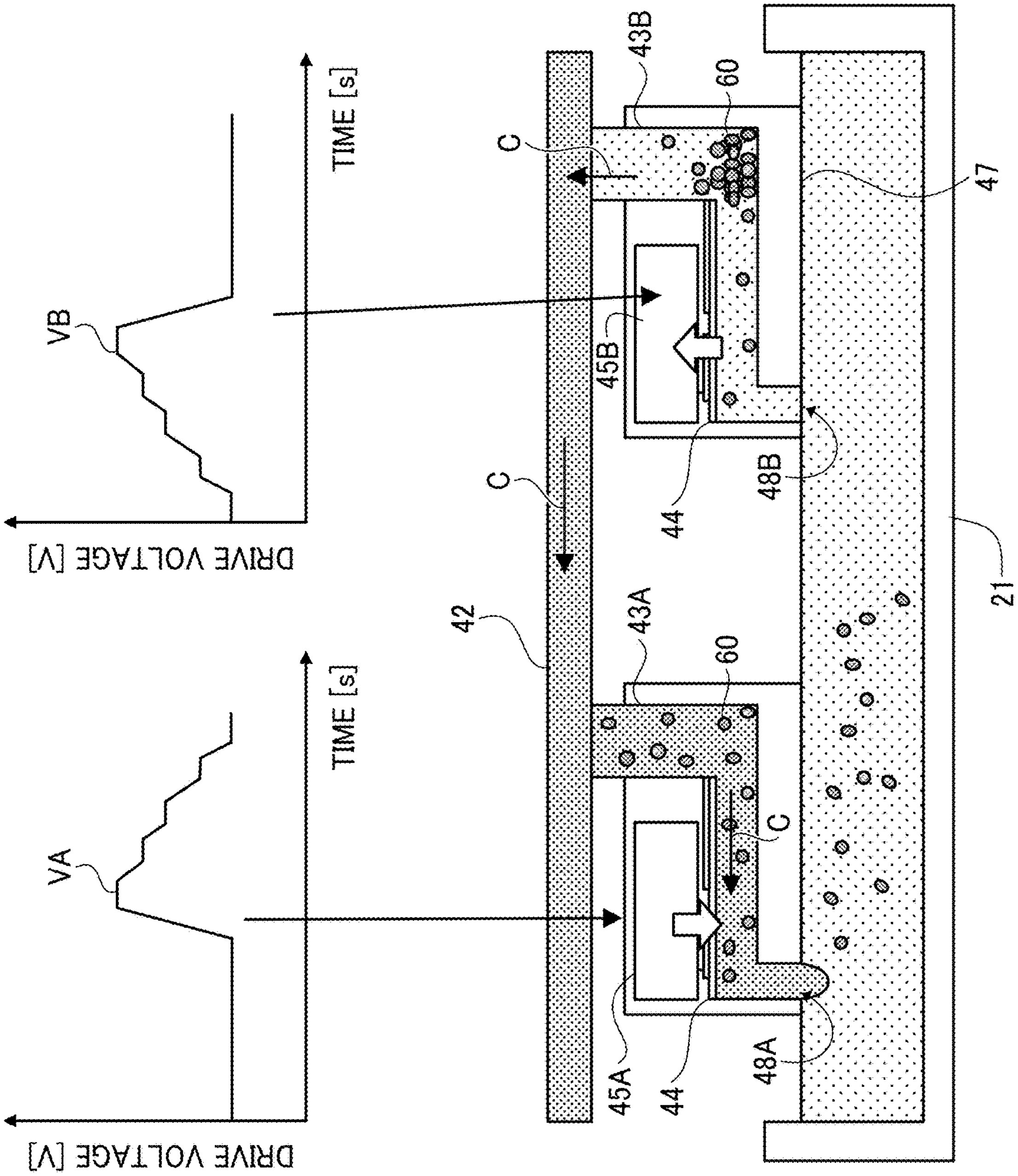
FIG. 10 is a diagram illustrating yet another example of the drive method in which the cleaning liquid is circulated through adjacent nozzles in opposite directions.

A description is given below of a configuration in which the head driver 510 operates the piezoelectric element 45 so as to circulate the cleaning liquid R. As illustrated in FIG. 10, in the present embodiment, multiple nozzles 48 connected to each other via the supply channel 43 and the common liquid chamber 42 are disposed on the nozzle surface 47.

One of the two connected nozzles 48 is referred to as a discharge-side nozzle 48A, and the other is referred to as a suction-side nozzle 48B. Similarly, the respective supply channels 43 are referred to as supply channels 43A and 43B, and the corresponding piezoelectric elements 45A and 45B are disposed in the supply channels 43A and 43B, respectively.

In the present embodiment, for ease of explanation, the discharge-side nozzle 48A and the suction-side nozzle 48B are described as nozzles adjacent to each other in the same nozzle row Na, but the discharge-side nozzle 48A and the suction-side nozzle 48B may be two nozzles separated from each other to circulate the cleaning liquid R as described below.

Figure 11:
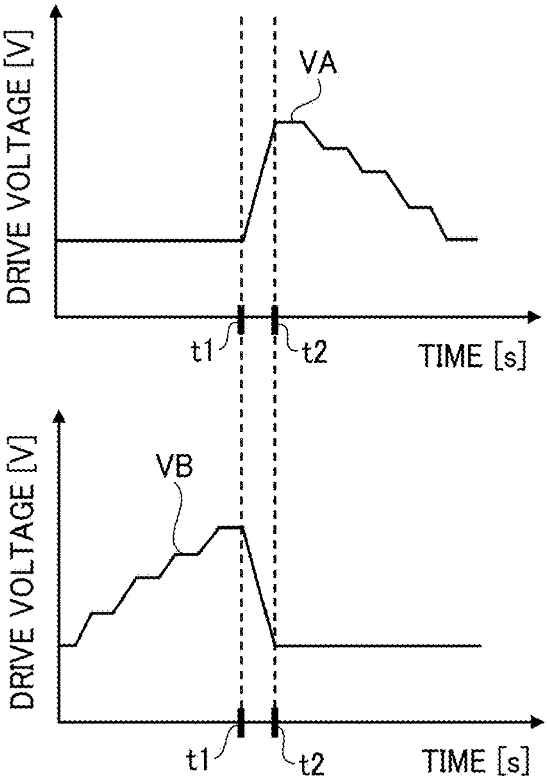
FIG. 11 is a diagram illustrating an example of control signals of the drive method illustrated in FIG. 10.

FIGS. 10 and 11 illustrate a drive waveform VA for the discharge-side nozzle 48A and a drive waveform VB for the suction-side nozzle 48B applied by the head driver 510. As illustrated by arrow in FIG. 10, when a voltage of the drive waveform VA increases in the positive direction, the piezoelectric element 45A expands, thereby increasing the pressure in the supply channel 43A. Thus, the piezoelectric element 45A is displaced so as to discharge the ink Q from the discharge-side nozzles 48A. At the same time, when the head driver 510 lowers a voltage of the drive waveform VB, the piezoelectric elements 45B contract. Thus, the piezoelectric element 45B moves to cause the cleaning liquid R to flow into the suction-side nozzles 48B.

The head driver 510 applies the drive waveform VA to apply vibration to the piezoelectric element 45A, thereby discharging the ink Q (or the circulated cleaning liquid R) from the discharge-side nozzle 48A. Simultaneously, the head driver 510 applies the drive waveform VB to apply vibration to the piezoelectric element 45B, thereby causing the cleaning liquid R to flow into the suction-side nozzle 48B. As a result, a flow in a circulation direction indicated by arrow C in FIG. 10 is generated, thereby further accelerating the replacement of the ink Q with the cleaning liquid R.

As described above, the head driver 510 respectively applies the drive waveforms in opposite directions (e.g., the drive waveforms VA and VB illustrated in FIGS. 10 and 11) to the piezoelectric elements 45A and 45B for the discharge-side nozzle 48A and the suction-side nozzle 48B adjacent to each other in the nozzle row Na so as to circulate the cleaning liquid R.

As illustrated in FIG. 11, the drive waveform VA and the drive waveform VB are the "drive waveforms in opposite directions" with respect to the time axis, but are not limited to such a shape illustrated in FIG. 11. For example, as illustrated by broken lines in FIG. 11, when a slope of the drive waveform VA and a slope of the drive waveform VB have the same absolute value having opposite signs (positive and negative signs) in an arbitrary interval divided by times t1 and t2, the ink Q (or the circulated cleaning liquid R) is discharged from the discharge-side nozzle 48A and the cleaning liquid R is sucked (drawn into an interior of the recording head 4) from the suction-side nozzle 48B. As described above, the voltages of the drive waveforms VA and VB change in opposite directions so that the piezoelectric elements 45A and 45B are displaced in opposite directions to each other in a certain interval indicated by the broken lines in FIG. 11 to circulate the cleaning liquid R.

Figure 12A:
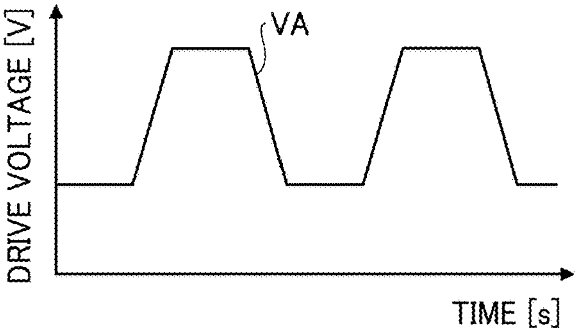
FIGS. 12A and 12B are diagrams illustrating another example of the control signals of the drive method illustrated in FIG. 10.
Figure 12B:
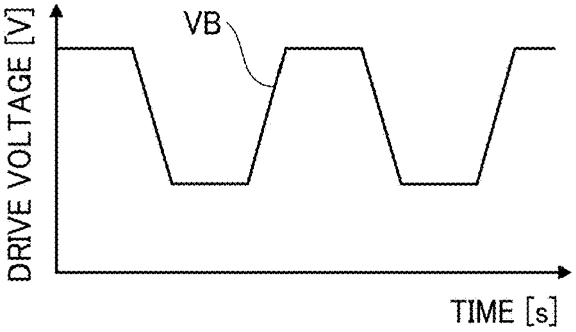

When the drive waveforms VA and VB have periodicity, the drive waveform VA and the drive waveform VB preferably have opposite phases to each other as illustrated in FIGS. 12A and 12B. Such drive waveform generates the flow in the circulation direction while applying continuous vibration to the piezoelectric elements 45A and 45B, thereby further accelerating the replacement of the ink Q with the cleaning liquid R.

Figure 13:
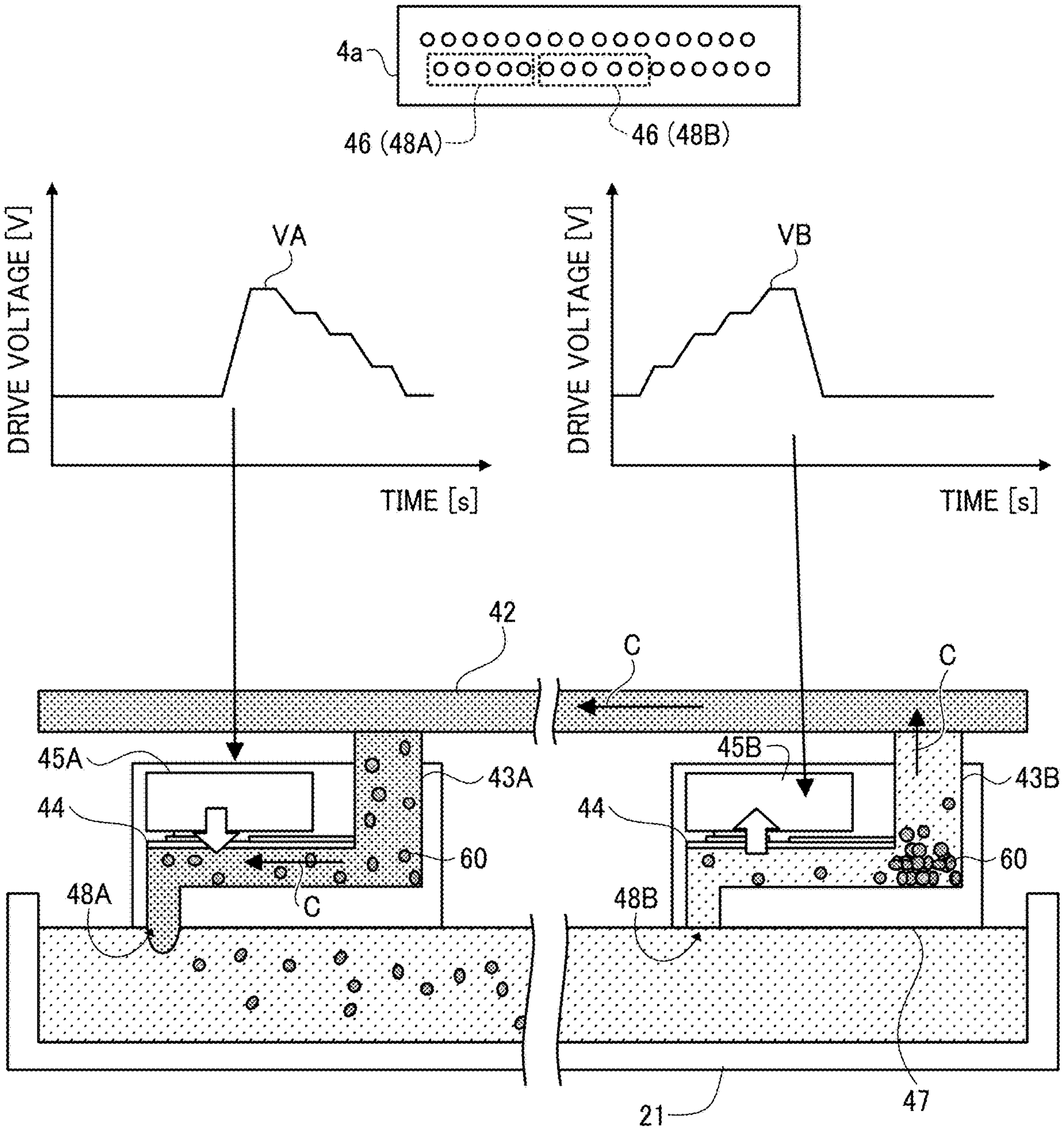
FIG. 13 is a diagram illustrating yet another example of the control signals of the drive method when multiple nozzles are grouped into one nozzle group.

As illustrated in FIG. 13, among the nozzles 48 forming the nozzle row Na, multiple nozzles within a predetermined range in the nozzle row Na may be grouped into one nozzle group 46 and controlled by the same drive waveform VA, and another nozzle group 46 adjacent to the nozzle group 46 may be controlled by the drive waveform VB in the opposite direction to the drive waveform VA to circulate the cleaning liquid R.

As described above, when the multiple nozzles 48 are grouped into one nozzle group 46, the voltages of the drive waveforms applied to the piezoelectric elements 45 corresponding to the nozzle groups 46 adjacent to each other are adjusted so that the piezoelectric elements 45 corresponding to the adjacent nozzle groups 46 are displaced in opposite directions. As a result, the cleaning liquid R is circulated between the adjacent nozzle groups 46 including the multiple nozzles 48, similarly to the example illustrated in FIG. 10.

With such a configuration, the cleaning liquid R can be sucked or discharged through the nozzle group 46 including the multiple nozzles 48 at the same time, and multiple circulation flows are generated in the recording head 4, thereby stirring the cleaning liquid R and the ink Q more efficiently to increase the speed of the maintenance.

The combination of these nozzle groups 46 is arbitrary, and for example, the range may be divided into two at the center of the nozzle row, or the range may be divided into multiple ranges and a different drive waveform may be applied to the piezoelectric elements 45 corresponding to each of the multiple ranges. The drive waveform may be freely set so as to efficiently circulate the cleaning liquid R held in the cap 21 and the ink Q in the recording head 4.

Figure 14:
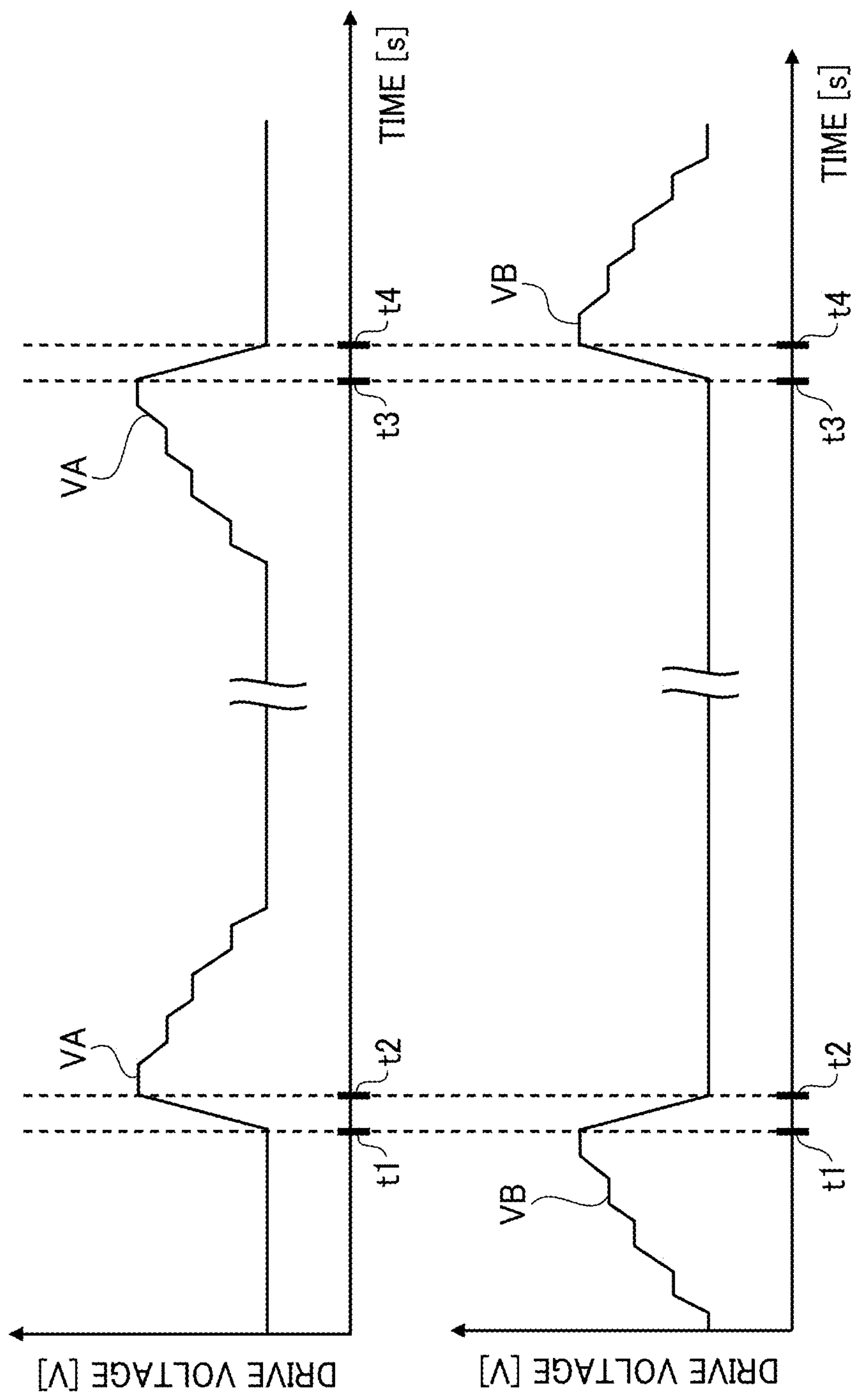
FIG. 14 is a diagram illustrating still another example of the control signals of the drive method when a circulation direction of the cleaning liquid is reversed.

In addition to the application of the drive waveform to circulate the cleaning liquid R as described above, the head driver 510 may switch positive and negative of the drive waveforms VA and VB as illustrated in FIG. 14 after a predetermined time has elapsed (i.e., a predetermined condition) so that the circulation direction of the cleaning liquid R is reversed.

In such a case, the ink Q is discharged from the discharge-side nozzle 48A in the interval between the times t1 and t2, and the cleaning liquid R is sucked from the discharge-side nozzle 48A in a reversed interval between times t3 and t4. Similarly, the cleaning liquid R is sucked from the suction-side nozzle 48B in the interval between the times t1 and t2, and the ink Q is discharged from the suction-side nozzle 48B in the reversed interval between the times 3 and 4.

As described above, in addition to the above-described configuration, when the circulation direction is reversed after a predetermined time elapses, a large turbulent flow is likely to be generated when the circulation direction is reversed, and the caking can be more efficiently eliminated by the turbulent flow.

Aspect 1

The maintenance device 20 as a head maintenance device according to the present embodiment includes the cap 21 and the circuitry (i.e., the controller 500 and the head driver 510). The cap 21 is detachably attachable to the nozzle surface 47 of the recording head 4 as a head to cover the nozzle surface 47 having the nozzle 48. The circuitry causes the cap 21 to contact the nozzle surface 47 of the recording head 4 to form a space between the nozzle surface 47 and the cap 21 filled with the cleaning liquid R, and applies a drive waveform to the piezoelectric element 45 of the recording head 4 to apply vibration to the cleaning liquid R in the space. The drive waveform causes the recording head 4 to draw the cleaning liquid R into an interior of the recording head 4 through the nozzle 48.

With such a configuration, the nozzle clogging of the head can be eliminated in a short period of time.

Aspect 2

In Aspect 1, the drive waveform has different amplitudes and different periods to generate a turbulent flow of the cleaning liquid R in the interior of the recording head 4.

With such a configuration, since the drive waveform having a random waveform causes the piezoelectric element 45 to vibrate, the caking can be removed more quickly and the nozzle clogging of the head can be eliminated in a short period of time.

Aspect 3

The maintenance device 20 as a head maintenance device according to the present embodiment includes the cap 21 and the circuitry (i.e., the controller 500 and the head driver 510). The cap 21 is detachably attachable to the nozzle surface 47 of the recording head 4 as a head to cover the nozzle surface 47 having the nozzle row Na (Nb) having the multiple nozzles 48. The circuitry causes the cap 21 to contact the nozzle surface 47 to form a space between the nozzle surface 47 and the cap 21 filled with the cleaning liquid R, and applies multiple drive waveforms to the multiple piezoelectric elements 45 of the recording head 4 to apply vibration to the cleaning liquid R in the space. The multiple drive waveforms cause the recording head 4 to circulate the cleaning liquid R between the space and an interior of the recording head 4 through the multiple nozzles 48 in a circulation direction.

With such a configuration, the nozzle clogging of the head can be eliminated in a short period of time.

Aspect 4

The image forming apparatus 100 as an image forming apparatus includes the maintenance device 20 as the head maintenance device according to Aspect 3 and the recording head 4 to drive the multiple piezoelectric elements 45 to discharge a liquid from each of the multiple nozzles 48 in the nozzle row Na (Nb) on the nozzle surface 47. The multiple nozzles 48 has a first nozzle and a second nozzle adjacent to the first nozzle. The multiple piezoelectric elements 45 includes a first piezoelectric element to discharge a liquid from the first nozzle and a second piezoelectric element adjacent to the first piezoelectric element. The second piezoelectric element discharges the liquid from the second nozzle. The multiple drive waveforms includes a drawing drive waveform to cause the recording head 4 to draw the cleaning liquid R from the space into the interior of the recording head 4 through the multiple nozzles 48 and a discharge drive waveform to cause the recording head 4 to discharge the cleaning liquid R from the interior of the recording head 4 to the space through the multiple nozzles 48. Further, the circuitry applies the drawing drive waveform to the first piezoelectric element, applies the discharge drive waveform to the second piezoelectric element, and circulates the cleaning liquid R between the space and the interior of the recording head 4 through the first nozzle and the second nozzle in the circulation direction.

With such a configuration, the cleaning liquid R flows so as to circulate between the adjacent nozzles 48, the replacement of the ink Q with the cleaning liquid R is accelerated, and the nozzle clogging of the head can be eliminated in a short period of time.

Aspect 5

The image forming apparatus 100 as an image forming apparatus includes the maintenance device 20 as the head maintenance device according to Aspect 3 and the recording head 4 to drive the multiple piezoelectric elements 45 to discharge a liquid from each of the multiple nozzles 48 in the nozzle row Na (Nb) on the nozzle surface 47. The multiple nozzles 48 has the first nozzle group 46 in a first range of the nozzle row Na (Nb) and the second nozzle group 46 in a second range of the nozzle row Na (Nb) adjacent to the first range. The multiple piezoelectric elements 45 includes a first piezoelectric element group to discharge a liquid from the first nozzle group 46 and a second piezoelectric element group adjacent to the first piezoelectric element group. The second piezoelectric element group discharges the liquid from the second nozzle group 46. The multiple drive waveforms includes a drawing drive waveform to cause the recording head 4 to draw the cleaning liquid R from the space into the interior of the recording head 4 through the multiple nozzles 48 and a discharge drive waveform to cause the recording head 4 to discharge the cleaning liquid R from the interior of the recording head 4 to the space through the multiple nozzles 48. Further, the circuitry applies the drawing drive waveform to the first piezoelectric element group, applies the discharge drive waveform to the second piezoelectric element group, and circulates the cleaning liquid R between the space and the interior of the recording head 4 through the first nozzle group and the second nozzle group in the circulation direction.

With such a configuration, the cleaning liquid R flows so as to circulate between the adjacent nozzle groups (i.e., the first and second nozzle groups 46), the replacement of the ink Q with the cleaning liquid R is accelerated, and the nozzle clogging of the head can be eliminated in a short period of time.

Aspect 6

In Aspect 4, the circuitry applies the discharge drive waveform to the first piezoelectric element, applies the drawing drive waveform to the second piezoelectric element, and reverses the circulation direction of the cleaning liquid.

With such a configuration, the replacement of the ink Q with the cleaning liquid R is accelerated, and the nozzle clogging of the head can be eliminated in a short period of time. In addition, since the large turbulent flow is generated when the circulation direction of the cleaning liquid R is changed, the caking can be removed more rapidly.

Aspect 7

The image forming apparatus 100 as an image forming apparatus includes the maintenance device 20 as the head maintenance device according to any one of Aspects 1 to 3 and the recording head 4 as a head to drive the multiple piezoelectric elements 45 to discharge the liquid from the nozzle 48 on the nozzle surface 47.

With such a configuration, the image forming apparatus can eliminate the nozzle clogging in a short period of time.

Aspect 8

A head maintenance method includes causing the cap 21 filled with the cleaning liquid R to contact the nozzle surface 47 of the recording head 4 to cover the nozzle surface 47 having the nozzle 48 to form a space between the nozzle surface 47 and the cap 21, and applying a drive waveform to the piezoelectric element 45 of the recording head 4 to apply vibration to the cleaning liquid R in the space. The drive waveform causes the recording head 4 to draw the cleaning liquid R into an interior of the recording head 4 through the nozzle 48.

The nozzle clogging of the head can be eliminated in a short period of time by the head maintenance method.

The effects described in the embodiments of the present disclosure are listed as examples of preferable effects derived from the present disclosure, and therefore are not limited to the effects described above. For example, the head driver 510 may control the operation of the piezoelectric element 45 in combination with some of the above-described controls to maintain the recording head 4.

As described above, according to the present disclosure, the nozzle clogging of the head, which is not recovered to normally discharge the liquid by a normal maintenance operation, can be eliminated in a short period of time.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A head maintenance device, comprising:
a cap detachably attachable to a nozzle surface of a head to cover the nozzle surface having a nozzle, the head including a piezoelectric element; and
circuitry configured to:
cause the cap to contact the nozzle surface of the head to form a space between the nozzle surface and the cap, the cap filled with a cleaning liquid; and
apply a drive waveform, to the piezoelectric element to apply vibration to the cleaning liquid, to cause the head to draw the cleaning liquid into an interior of the head through the nozzle, wherein
the drive waveform has different amplitudes and different periods to vibrate the piezoelectric element to generate a turbulent flow of the cleaning liquid in the interior of the head.

2. An image forming apparatus, comprising:
the head maintenance device according to claim 1; and
the head configured to drive the piezoelectric element to discharge the liquid from the nozzle on the nozzle surface.

3. The head maintenance device according to claim 1, wherein circuitry is configured to apply the drive waveform to the piezoelectric element to both apply vibration to the cleaning liquid in the space and cause the head to draw the cleaning liquid into an interior of the head through the nozzle.

4. The head maintenance device according to claim 1, wherein the drive waveform includes a contraction phase to cause the head to draw the cleaning liquid into the interior.

5. A head maintenance device, comprising:
a cap detachably attachable to a nozzle surface of a head to cover the nozzle surface having a nozzle row having multiple nozzles, the head including multiple piezoelectric elements; and
circuitry configured to:
cause the cap to contact the nozzle surface to form a space between the nozzle surface and the cap, the cap filled with a cleaning liquid; and
apply multiple drive waveforms, to the multiple piezoelectric elements to apply vibration to the cleaning liquid, to cause the head to circulate the cleaning liquid between the space and an interior of the head through the multiple nozzles in a circulation direction, wherein
the multiple drive waveforms have different amplitudes and different periods to vibrate the piezoelectric elements to generate a turbulent flow of the cleaning liquid in the interior of the head.

6. An image forming apparatus comprising:
the head maintenance device according to claim 3; and
the head, wherein
the multiple nozzles include a first nozzle and a second nozzle adjacent to the first nozzle,
the multiple piezoelectric elements include:
a first piezoelectric element to discharge a liquid from the first nozzle; and
a second piezoelectric element adjacent to the first piezoelectric element, the second piezoelectric element to discharge the liquid from the second nozzle,
the multiple drive waveforms include:
a drawing drive waveform to cause the head to draw the cleaning liquid from the space into the interior of the head through the multiple nozzles; and
a discharge drive waveform to cause the head to discharge the cleaning liquid from the interior of the head to the space through the multiple nozzles, and
the circuitry is further configured to:
apply the drawing drive waveform to the first piezoelectric element;
apply the discharge drive waveform to the second piezoelectric element; and
circulate the cleaning liquid between the space and the interior of the head through the first nozzle and the second nozzle in the circulation direction.

7. The image forming apparatus according to claim 6, wherein the circuitry is further configured to:
apply the discharge drive waveform to the first piezoelectric element;
apply the drawing drive waveform to the second piezoelectric element; and
reverse the circulation direction of the cleaning liquid.

8. An image forming apparatus, comprising:
the head maintenance device according to claim 5; and
the head configured to drive the multiple piezoelectric elements to discharge a liquid from each of the multiple nozzles in the nozzle row on the nozzle surface, wherein
the multiple nozzles include:
a first nozzle group in a first range of the nozzle row; and a second nozzle group in a second range of the nozzle row adjacent to the first range, the multiple piezoelectric elements include:

a first piezoelectric element group configured to discharge a liquid from the first nozzle group; and a second piezoelectric element group adjacent to the first piezoelectric element group, the second piezoelectric element group configured to discharge the liquid from the second nozzle group, the multiple drive waveforms include:

a drawing drive waveform configured to cause the head to draw the cleaning liquid from the space into the interior of the head through the multiple nozzles; and a discharge drive waveform configured to cause the head to discharge the cleaning liquid from the interior of the head to the space through the multiple nozzles, and the circuitry is further configured to:

apply the drawing drive waveform to the first piezoelectric element group;

apply the discharge drive waveform to the second piezoelectric element group; and circulate the cleaning liquid between the space and the interior of the head through the first nozzle group and the second nozzle group in the circulation direction.

9. A head maintenance method, comprising:

causing a cap, filled with a cleaning liquid, to contact a nozzle surface of a head to cover the nozzle surface, wherein the head includes a piezoelectric element, the nozzle surface has a nozzle, and the cap contacting the nozzle surface forms a space between the nozzle surface and the cap; and applying a drive waveform, to the piezoelectric element to apply vibration to the cleaning liquid, to cause the head to draw the cleaning liquid into an interior of the head through the nozzle, wherein the drive waveform has different amplitudes and different periods to vibrate the piezoelectric element to generate a turbulent flow of the cleaning liquid in the interior of the head.

* * * * *